Patented May 26, 1931

1,807,458

UNITED STATES PATENT OFFICE

MARTIN E. WELAND, OF CHICAGO, ILLINOIS

PROCESS OF HANDLING AND WRAPPING MARGARINE

Application filed May 11, 1929. Serial No. 362,450.

This invention relates to a process of handling and wrapping margarine, butter, lard or like edibles, and has for an object the prevention of any loss of weight through handling or wrapping during packaging of the same.

In common practice of packaging, the margarine or the like is formed into a large rectangular shaped brick of about the same cross-sectional dimensions as a one-pound block of butter, only much longer, and it is then cut from this brick into sections of one pound each. The margarine or the like is then conveyed by long belts to wrapping stations where the blocks are wrapped with paper by hand or by machinery. It is between this time of cutting and wrapping that a loss takes place either through evaporation or contact with the operator, or parts handling the same. The common expedient to overcome this loss is to cut the blocks a fraction of an ounce over weight when they are being divided into one pound sections. This extra fraction of an ounce is wasted, as will be seen, and when there is a large production of blocks per day, will amount to a substantial loss and cost to the manufacturer.

In my process I propose a novel means to overcome this loss whereby the margarine or the like may be cut from the initial brick into blocks of exact predetermined sales package size and weight, and may be handled or exposed to other frictional wrapping conditions without losing any weight.

To accomplish this desirable result, I pass the blocks, immediately after cutting into predetermined sizes, through a box of sufficient length wherein the temperature has been reduced close to zero, so that the entire surfaces of the blocks will become solidified and provided with a thin frozen surface coat which will resist any cause to make it lose weight through handling and wrapping.

I do not wish to set forth any specific type of freezing apparatus to accomplish this surface freezing result, and in fact any freezing chamber of sufficiently low temperature may be used without departing from the spirit of my invention as set forth in the appended claims.

It will also be understood that any mechanical means may be used for conveying and handling, and also any desired way or means for wrapping. The essential and novel step in my process consists in the surface hardening of the edible by chilling so that it can be handled without the loss of weight by evaporation or by adhering to the parts contacting therewith.

Having thus described my process, I claim:

1. Process for handling and wrapping margarine consisting in shaping a predetermined amount of said food product for wrapping, subjecting said predetermined amount to a temperature sufficiently low to solidify the surfaces only thereof, and then wrapping said predetermined amount while the surfaces are still in their solidified state.

2. Process for handling and wrapping margarine consisting in cutting said food product into blocks of predetermined size and sales weight, subjecting said blocks to a temperature sufficiently low to solidify the surfaces only thereof, and then wrapping the said blocks while these surfaces are still in their solidified state.

In testimony whereof, I affix my signature.

MARTIN E. WELAND.